United States Patent
Russell et al.

(10) Patent No.: US 11,707,790 B2
(45) Date of Patent: Jul. 25, 2023

(54) RIVET FASTENER APPARATUS

(71) Applicant: JR Automation Technologies, LLC, Holland, MI (US)

(72) Inventors: Joseph Robert Russell, Jenison, MI (US); Jason R. Turman, Grand Haven, MI (US); Ryan Nathan Anderson, Dayton, OH (US); Marcos Merino, Grand Rapids, MI (US); Gabriel C. Van't Land, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 0 days.

(21) Appl. No.: 17/170,226

(22) Filed: Feb. 8, 2021

(65) Prior Publication Data
US 2021/0245234 A1    Aug. 12, 2021

Related U.S. Application Data

(60) Provisional application No. 63/031,882, filed on May 29, 2020, provisional application No. 62/971,929, filed on Feb. 8, 2020.

(51) Int. Cl.
*B23Q 17/00*    (2006.01)
*B23Q 17/22*    (2006.01)
(Continued)

(52) U.S. Cl.
CPC ............ *B23B 31/028* (2013.01); *B21J 15/14* (2013.01); *B23B 31/1075* (2013.01);
(Continued)

(58) Field of Classification Search
CPC . B21J 15/02; B21J 15/04; B21J 15/046; B21J 15/14; B21J 15/30; B21J 15/36; Y10T 29/5377; Y10T 29/5107; B23P 23/04
See application file for complete search history.

(56) References Cited

U.S. PATENT DOCUMENTS 2,925,748 A * 2/1960 Ross ...................... B21J 15/02
                                                           29/243.54
3,502,836 A * 3/1970 Woolley ................ B21J 15/046
                                                             200/275
(Continued)

FOREIGN PATENT DOCUMENTS

SU          996041 A1    2/1983
SU        1255265 A1    9/1986

*Primary Examiner* — Matthew P Travers
(74) *Attorney, Agent, or Firm* — The Watson IP Group, PLC; Jovan N. Jovanovic

(57) ABSTRACT

A method and rivet apparatus to rivet a workpiece comprises an upper riveting portion and a lower riveting portion. The lower riveting portion comprising a fixed base, support member, and a pin assembly. The pin assembly comprises a center pin, a forming pin, a first biasing member, an outer shroud, and a second biasing member. The center pin pushes against a tail of a rivet to deform the tail of the rivet. The forming pin, fixedly coupled to the support member, pushes against the tail of the rivet to deform the tail of the rivet. The first biasing member, disposed below the center pin, biases the center pin through the forming pin and away from the support member. The outer shroud encircles the forming pin and the center pin. The second biasing member, disposed below the outer shroud, biases the outer shroud away from the support member.

12 Claims, 14 Drawing Sheets

(51) Int. Cl.
*B23Q 3/18* (2006.01)
*B21J 15/14* (2006.01)
*B23P 23/04* (2006.01)
*B21J 15/02* (2006.01)
*B21J 15/30* (2006.01)
*B21J 15/32* (2006.01)
*B23Q 16/00* (2006.01)
*B23B 31/02* (2006.01)
*B23B 39/16* (2006.01)
*B23B 31/107* (2006.01)
*B23B 51/10* (2006.01)
*B23B 35/00* (2006.01)
*B23Q 15/007* (2006.01)

(52) U.S. Cl.
CPC .......... *B23B 39/161* (2013.01); *B23B 51/107* (2013.01); *B23P 23/04* (2013.01); *B23Q 3/18* (2013.01); *B23Q 3/183* (2013.01); *B23Q 17/006* (2013.01); *B23Q 17/2216* (2013.01); *B21J 15/02* (2013.01); *B21J 15/30* (2013.01); *B21J 15/32* (2013.01); *B23B 35/00* (2013.01); *B23Q 15/0075* (2013.01); *B23Q 16/00* (2013.01)

(56) References Cited

U.S. PATENT DOCUMENTS

| | | | | |
|---|---|---|---|---|
| 3,518,745 A * | 7/1970 | Gray | ........................ | B23P 19/00 |
| | | | | 29/271 |
| 3,646,660 A * | 3/1972 | Sheffer, Jr. | ............... | B21J 15/14 |
| | | | | 29/243.53 |
| 3,729,801 A * | 5/1973 | Gregory | ................... | B21J 15/10 |
| | | | | 29/243.53 |
| 3,729,809 A * | 5/1973 | Vawter | ..................... | B21J 15/10 |
| | | | | 29/243.53 |
| 3,802,060 A * | 4/1974 | Gross | ........................ | B21J 15/32 |
| | | | | 29/464 |
| 4,578,846 A * | 4/1986 | Schott | ...................... | B21J 15/10 |
| | | | | 29/243.53 |
| 5,214,837 A * | 6/1993 | Stafford | ................... | B21J 15/10 |
| | | | | 29/243.53 |
| 5,375,754 A | 12/1994 | Botha et al. | | |
| 5,855,054 A * | 1/1999 | Rivera | ..................... | B21J 15/26 |
| | | | | 29/525.06 |
| 2003/0207742 A1* | 11/2003 | Hazlehurst | ................ | B64F 5/10 |
| | | | | 483/36 |
| 2012/0167366 A1* | 7/2012 | Mauer | .................... | B21J 15/025 |
| | | | | 29/407.08 |
| 2014/0208573 A1* | 7/2014 | Fast | ......................... | B21J 15/10 |
| | | | | 29/512 |
| 2018/0264539 A1* | 9/2018 | Kuniyil | .................. | B21J 15/40 |
| 2019/0134699 A1* | 5/2019 | Inagaki | .................. | B21J 15/30 |
| 2019/0262893 A1* | 8/2019 | Huff | ........................ | B21J 15/10 |
| 2021/0121940 A1* | 4/2021 | Kuldell | .................. | B21J 15/285 |

* cited by examiner

RIVET FASTENER APPARATUS

CROSS-REFERENCE TO RELATED APPLICATION

This application claims priority from U.S. Provisional Patent Application Ser. No. 62/971,929 filed on Feb. 8, 2020, entitled "SYSTEM AND METHOD FOR COUPLING FASTENER HARDWARE TO A BRACKET", and claims priority from U.S. Provisional Patent Application Ser. No. 63/031,882 filed on May 29, 2020, entitled "SYSTEM AND METHOD FOR COUPLING FASTENER HARDWARE TO A BRACKET", the entire disclosures of which are hereby incorporated by reference in their entirety.

BACKGROUND OF THE DISCLOSURE

1. Field of the Disclosure

The disclosure relates in general to a fastener apparatus, and more particularly, to a rivet fastener apparatus.

2. Background Art

In many applications it is necessary to join components together through a riveting operation. In one particular field of assembly, fastener hardware (including, but not limited to fastener hardware that is sometimes referred to as a nutplate) are utilized to join components. In such configurations, fastener hardware is riveted to brackets and then structures are attached to the fastener hardware.

The formation of rivet openings in brackets and the riveting of fastener hardware is often a labor-intensive process. Additionally, for many assemblies, multiple quantities of fastener hardware are mounted to a single bracket and the process is repeated many times to make the overall assembly.

Problematically, it is often difficult to quickly and expeditiously form the openings for the rivets and to economically apply the rivets. Additionally, it is often difficult to modify equipment to handle different types of fastener hardware and differently configured brackets.

SUMMARY OF THE DISCLOSURE

The disclosure is directed to a rivet apparatus to rivet a workpiece, the rivet apparatus comprising an upper riveting portion and a lower riveting portion. The lower riveting portion comprising a fixed base, support member, and a pin assembly. The pin assembly comprises a center pin, a forming pin, a first biasing member, an outer shroud, and a second biasing member. The center pin pushes against a tail of a rivet to deform the tail of the rivet. The forming pin, fixedly coupled to the support member, pushes against the tail of the rivet to deform the tail of the rivet. The first biasing member, disposed below the center pin, biases the center pin through the forming pin and away from the support member. The outer shroud encircles the forming pin and the center pin. The second biasing member, disposed below the outer shroud, biases the outer shroud away from the support member.

In accordance with at least one configuration, the pin assembly is a first pin assembly and the rivet is a first rivet. The lower riveting portion further comprises a second pin assembly comprising a second center pin, a second forming pin, a third biasing member, a second outer shroud, and a fourth biasing member. The second center pin pushes against a tail of a second rivet to deform the tail of the second rivet. The second forming pin, fixedly coupled to the support member, pushes against the tail of the second rivet to deform the tail of the second rivet. The third biasing member, disposed below the second center pin, biases the second center pin through the second forming pin and away from the support member. The second outer shroud encircles the second forming pin and the second center pin. The fourth biasing member, disposed below the second outer shroud, biases the second outer shroud away from the support member.

In accordance with at least one configuration, the lower riveting portion further includes a notch disposed on a distal end of the lower riveting portion, the notch disposed between the first pin assembly and the second pin assembly, with a portion of a fastener hardware being riveted to a bracket by the rivet apparatus being disposed within the notch.

In accordance with at least one configuration, the first and second biasing member are at least one of a spring, a pneumatic cylinder, and a gas shock.

In accordance with at least one configuration, the rivet apparatus further comprises a position sensor, disposed within the support member, to provide dynamic information relative to a stack-up thickness of the workpiece.

In accordance with at least one configuration, a system includes the rivet apparatus, the system further comprising a drill apparatus coupled to the rivet apparatus via a housing, the drill apparatus to drill a bracket of the workpiece.

In accordance with at least one configuration, wherein the rivet includes a countersink type head.

In accordance with at least one configuration, wherein the center pin is approximately a same width as the tail of the rivet.

In accordance with at least one configuration, wherein the center pin has a length such that a distal end of the center pin extends above a stack-up thickness of the workpiece disposed on the lower riveting portion.

In accordance with at least one configuration, the upper riveting portion includes a rivet pin to push on a head of the rivet while the center pin and the forming pin push on the tail of the rivet.

The disclosure is also directed to a method of riveting a workpiece comprising an upper riveting portion and a lower riveting portion. The method comprises pushing, by a center pin of the lower riveting portion, against a tail of a rivet to deform the tail of the rivet, and pushing, by a forming pin of the lower riveting portion the forming pin fixedly coupled to a support member, the tail of the rivet to deform the tail of the rivet. The method further comprises biasing, by a first biasing member of the lower riveting portion the first biasing member disposed below the center pin, the center pin through the forming pin and away from the support member, and biasing, by a second biasing member of the lower riveting portion the second biasing member disposed below an outer shroud encircling the forming pin and the center pin, the outer shroud away from the support member.

In accordance with at least one configuration, the pin assembly of the method is a first pin assembly and the rivet is a first rivet, and the pin assembly is a first pin assembly. The method further comprises pushing, by a second center pin of a second pin assembly of the lower riveting portion, against a tail of a second rivet to deform the tail of the second rivet, and pushing, by a second forming pin of the second pin assembly the second forming pin fixedly coupled to the support member, the tail of the second rivet to deform the tail of the second rivet. The method even further comprising biasing, by a third biasing member of the lower riveting portion the third biasing member disposed below the second center pin, the second center pin through the second forming pin and away from the support member, and biasing, by a fourth biasing member of the lower riveting portion the fourth biasing member disposed below a second outer shroud encircling the second forming pin and the second center pin, the second outer shroud away from the support member.

In accordance with at least one configuration of the method, the lower riveting portion further includes a notch disposed on a distal end of the lower riveting portion, the notch disposed between the first pin assembly and the second pin assembly, the method further comprising disposing a portion of a fastener hardware being riveted to a bracket by the rivet apparatus within the notch.

In accordance with at least one configuration of the method, the first and second biasing member of the method are at least one of a spring, a pneumatic cylinder, and a gas shock.

In accordance with at least one configuration of the method, the method further comprises providing, by a position sensor, dynamic information relative to a stack-up thickness of the workpiece.

In accordance with at least one configuration of the method, a system comprises the rivet apparatus and a drill apparatus coupled to the rivet apparatus via a housing, the method further comprising drilling a bracket of the workpiece with the drill apparatus.

In accordance with at least one configuration of the method, the rivet of the method includes a countersink type head.

In accordance with at least one configuration of the method, the center pin of the method is approximately a same width as the tail of the rivet.

In accordance with at least one configuration of the method, the center pin of the method has a length such that a distal end of the center pin extends above a stack-up thickness of the workpiece disposed on the lower riveting portion.

In accordance with at least one configuration of the method, the method further comprises pushing, by a rivet pin of the upper riveting portion, on a head of the rivet while the center pin and the forming pin push on the tail of the rivet.

BRIEF DESCRIPTION OF THE DRAWINGS

The disclosure will now be described with reference to the drawings wherein.

DETAILED DESCRIPTION OF THE DISCLOSURE

Figure 1A:
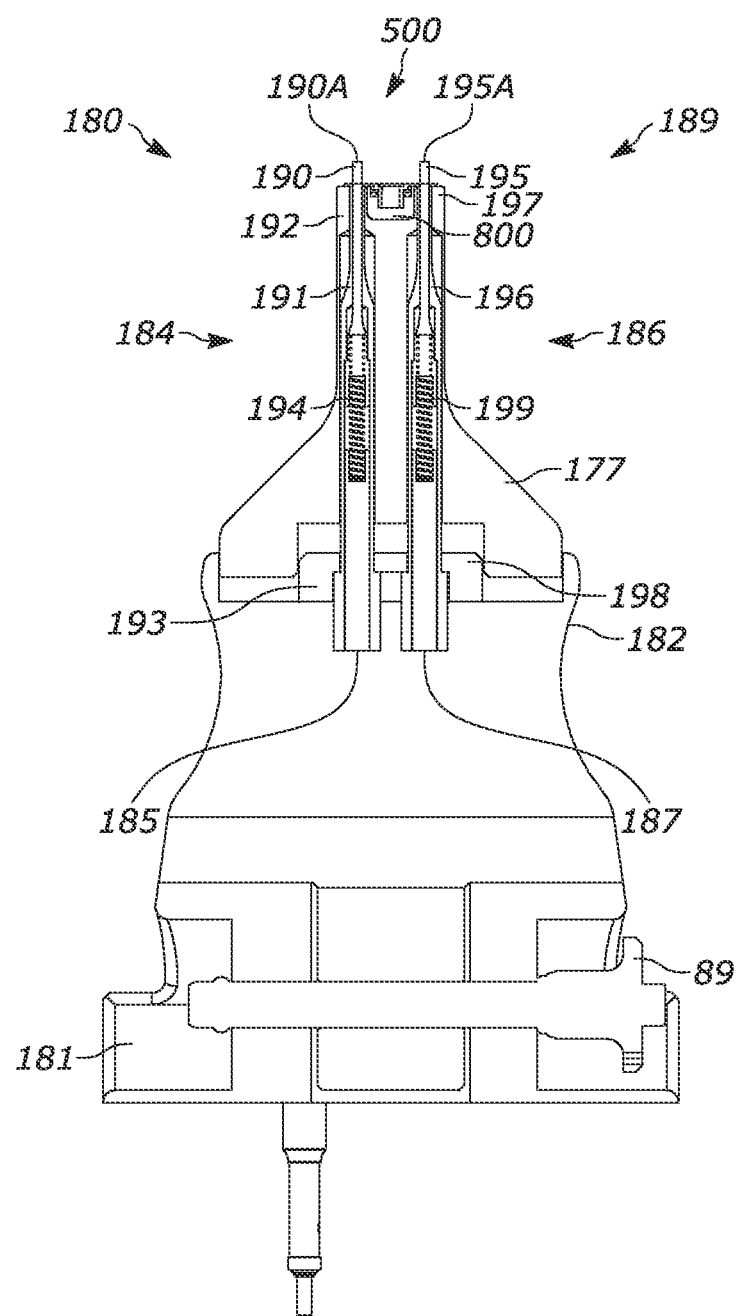
FIG. 1A illustrates a cut view of an example lower riveting portion of an example rivet apparatus, in accordance with at least one configuration.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1B:
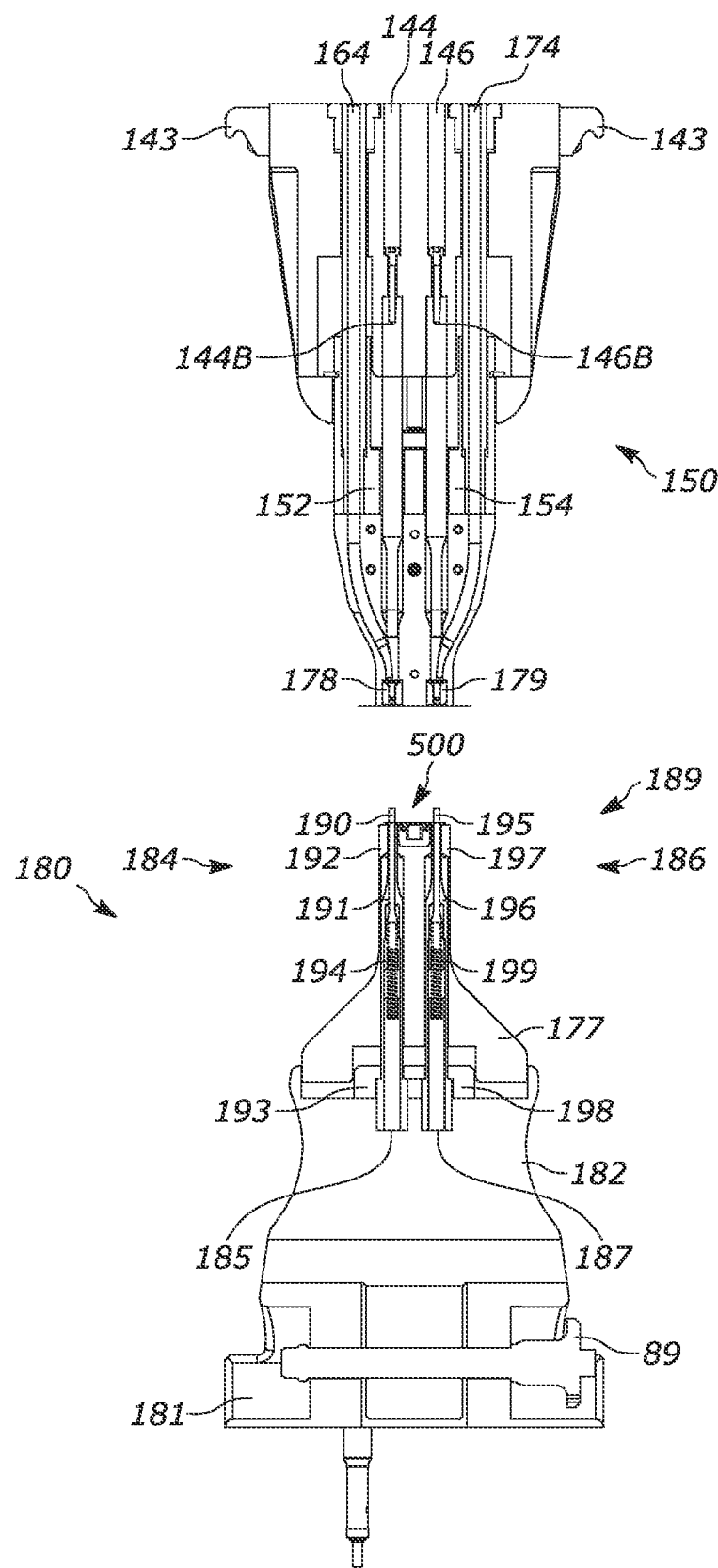
FIG. 1B illustrates another cut view of the lower riveting portion and a cut view of an example rivet block of an example upper riveting portion, in accordance with at least one configuration.
Figure 2:
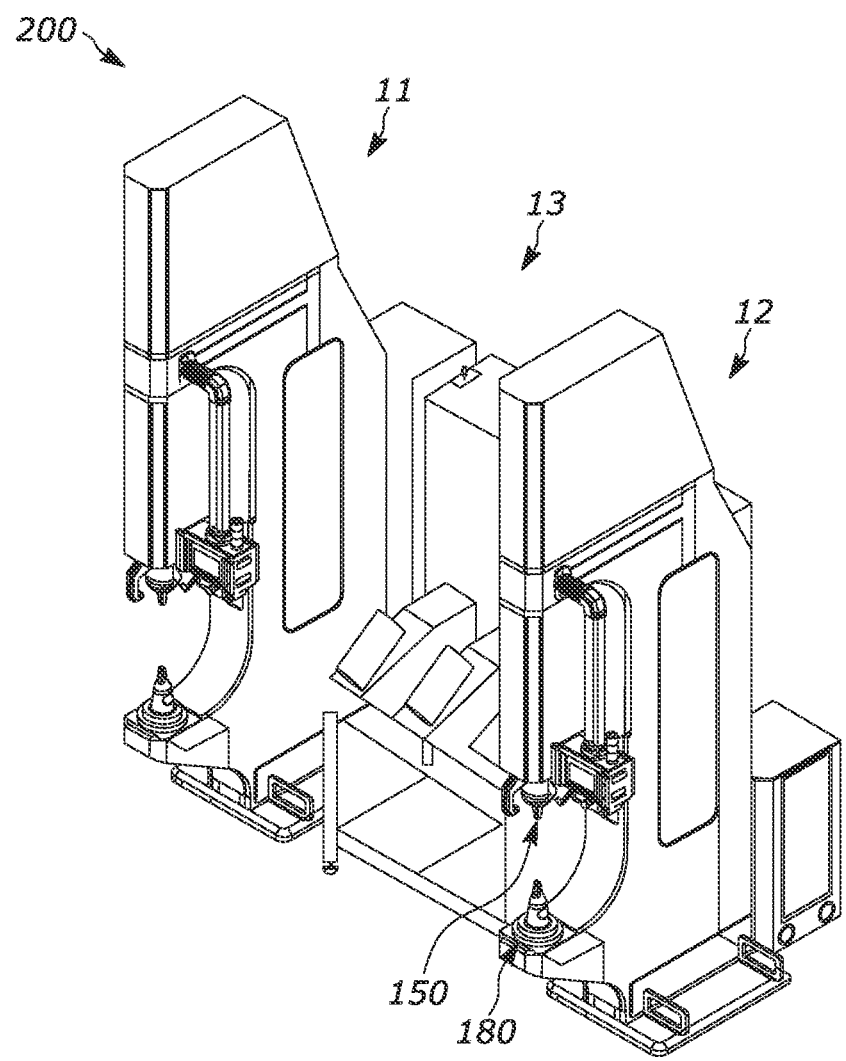
FIG. 2 illustrates an isometric view of an example system including the rivet apparatus and an example drill apparatus, the rivet apparatus including the lower portion shown in FIG. 1 in accordance with at least one configuration.
Figure 3:
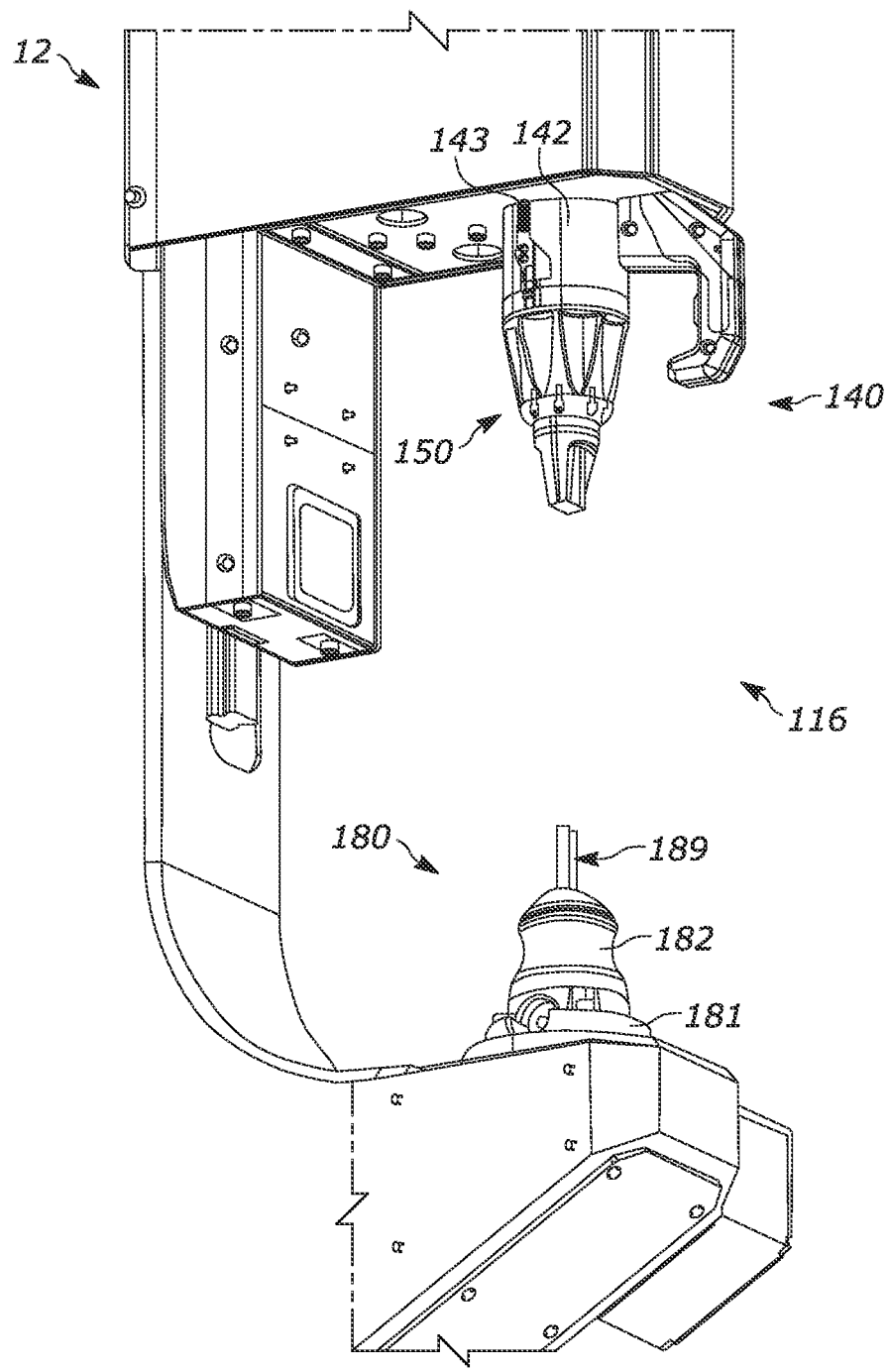
FIG. 3 illustrates another isometric view of the rivet apparatus shown in FIG. 2, in accordance with at least one configuration.
Figure 4:
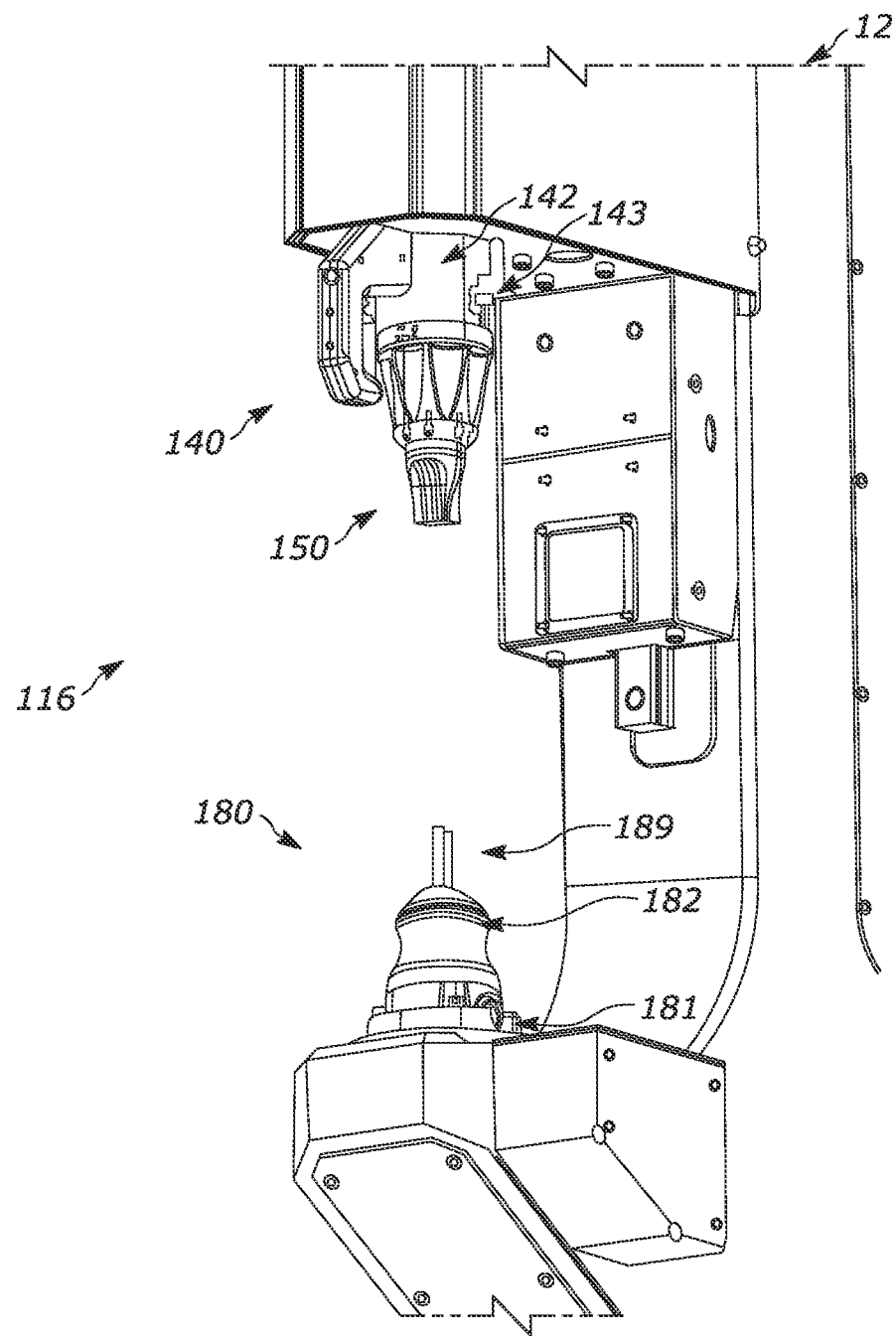
FIG. 4 illustrates yet another isometric view of the rivet apparatus shown in FIG. 2, in accordance with at least one configuration.

Referring now to the drawings and in particular to FIG. 1A, an apparatus is disclosed, such as a lower riveting portion 180 that is part of another apparatus, such as a rivet apparatus 12 (FIG. 2). A riveting assembly 116 is shown in FIG. 3 as comprising an upper riveting portion 140 (FIG. 1B) and the lower riveting portion 180. The upper riveting portion 140 positions one or more rivets for riveting a workpiece 500, while the lower riveting portion 180 deforms a tail end of the one or more rivets, such as rivets 161, 171, so as to expand tail ends 161B, 171B of the rivets 161, 171 to be wider than a shaft, disposed between heads 161A, 171A and the tails 161B, 171B of the of the rivets 161, 171 of the rivets 161, 171, thereby riveting together two portions of the workpiece 500, details of which are discussed in more detail below. Typical rivet apparatuses include powered, e.g., motorized, lower riveting portions, that work in conjunction with a powered upper riveting portion, which increases a complexity of such apparatuses. The lower riveting portion 180 disclosed herein at least mitigates such complexity by being able to deform a tail of a rivet, such as tails 161B, 171B of rivets 161, 171 (FIGS. 15 and 16), without use of a motorized lower portion thereby the lower riveting portion 180 remains stationary, as discussed in detail below. The configuration disclosed herein substantially simplifies the riveting apparatus 12, saving manufacturing costs and reducing operating costs, such as maintenance costs.

The lower riveting portion 180 is shown as including a fixed base 181, a support member 182, a first pin assembly 184, and a second pin assembly 186, the first pin assembly 184 and the second pin assembly 186 together forming a pin assembly mechanism 189. The support member 182 is coupled to the fixed base 181. In other configurations, the support member 182 can be fixedly coupled to the fixed base 181, such as via fasteners (e.g., pin 89). The base 181 can also be removable and replaceable to accommodate different geometries of different brackets. Likewise, the lower riveting portion 180 can be removable and replaceable with changes in pitch and rivet diameter. As such, the relatively heavy base 181 can be changed with less frequency (i.e., when geometry necessitates), while for many changes, only the riveting assembly 116 is changed out. In other configurations, the riveting assembly 116 can be a single assembly that is changed out.

The first pin assembly 184 includes a center pin 190, a forming pin 191, an outer shroud 192, and a biasing member 193. The first pin assembly 184 is coupled to the base 181 via a first support post 185. The forming pin 191 is fixedly coupled to the support member 182 and extends substantially perpendicularly outward from the support member 182. The center pin 190 is positioned within a bore of the forming pin 191 and can slidably move upward and downward within the forming pin 191 so that the upper end thereof is flush with or slightly below the upper end of the forming pin 191. The center pin 190 and the forming pin 191 push against the tail 161B of the rivet 161 to deform the tail 161B of the rivet 161. Another biasing member 194 is disposed below the center pin 190 and directs or biases the center pin 190 out through the forming pin 191 and away from the support member 182. The outer shroud 192 encircles the forming pin 191 and the center pin 190, and extends beyond the forming pin 191. The outer shroud 192 is biased away from the support member 182 by the biasing member 193 that is disposed below the outer shroud 192.

The second pin assembly 186 includes a center pin 195, a forming pin 196, an outer shroud 197, and a biasing member 198. The second pin assembly 186 is coupled to the base 181 via a second support post 187. The forming pin 196 is fixedly coupled to the support member 182 and extends substantially perpendicularly outward from the support member 182. The center pin 195 is positioned within a bore of the forming pin 196 and can slidably move upward and downward within the forming pin 196 so that the upper end thereof is flush with or slightly below the upper end of the center pin 190. The center pin 195 and the forming pin 196 push against the tail 171B of the rivet 171 to deform the tail 171B of the rivet 171. Another biasing member 199 is disposed below the center pin 190 and directs or biases the center pin 195 out through the forming pin 196 and away from the support member 182. The outer shroud 197 encircles the forming pin 196 and the center pin 195, and extends beyond the forming pin 196. The outer shroud 197 is biased away from the support member 182 by the biasing member 198 that is disposed below the outer shroud 198. The biasing members 193, 198 bias the outer shrouds 192, 197, respectively, to move upward away from the support member 182. In at least one configuration, the outer shrouds 192, 197 are coupled via a housing 177 of the lower riveting portion 180, as shown.

Likewise, the biasing members 194, 199 bias the center pins 190, 195, respectively, to move upward away from the support member 182, with the center pins 190, 195 moving independently from the outer shrouds 192, 197. The bias of the biasing members 194, 199 and the biasing members 193, 198 can be counted by a force provided by the upper riveting portion 140 pushing down toward the lower riveting portion 180. In at least one configuration of the rivet apparatus 12, the center pins 190, 195 are approximately a same width as the tails 161B, 171B of the rivets 161, 171, respectively. In at least one configuration of the rivet apparatus 12, the center pins 190, 195 have a length such that distal ends 190A, 195A of the center pins 190, 195, respectively, can extend above a stack-up thickness of the workpiece 500 disposed on the lower riveting portion 180. This length allows an operator to place the fastener hardware 501 onto the lower riveting portion 180, then place the bracket 502 on top of the fastener hardware 501, with the center pins 190, 195 keeping the fastener hardware 501 and the bracket 502 aligned until the rivets 161, 171 are disposed through the fastener hardware 501 and the bracket 502, that is until the workpiece 500 is riveted.

Figure 12:
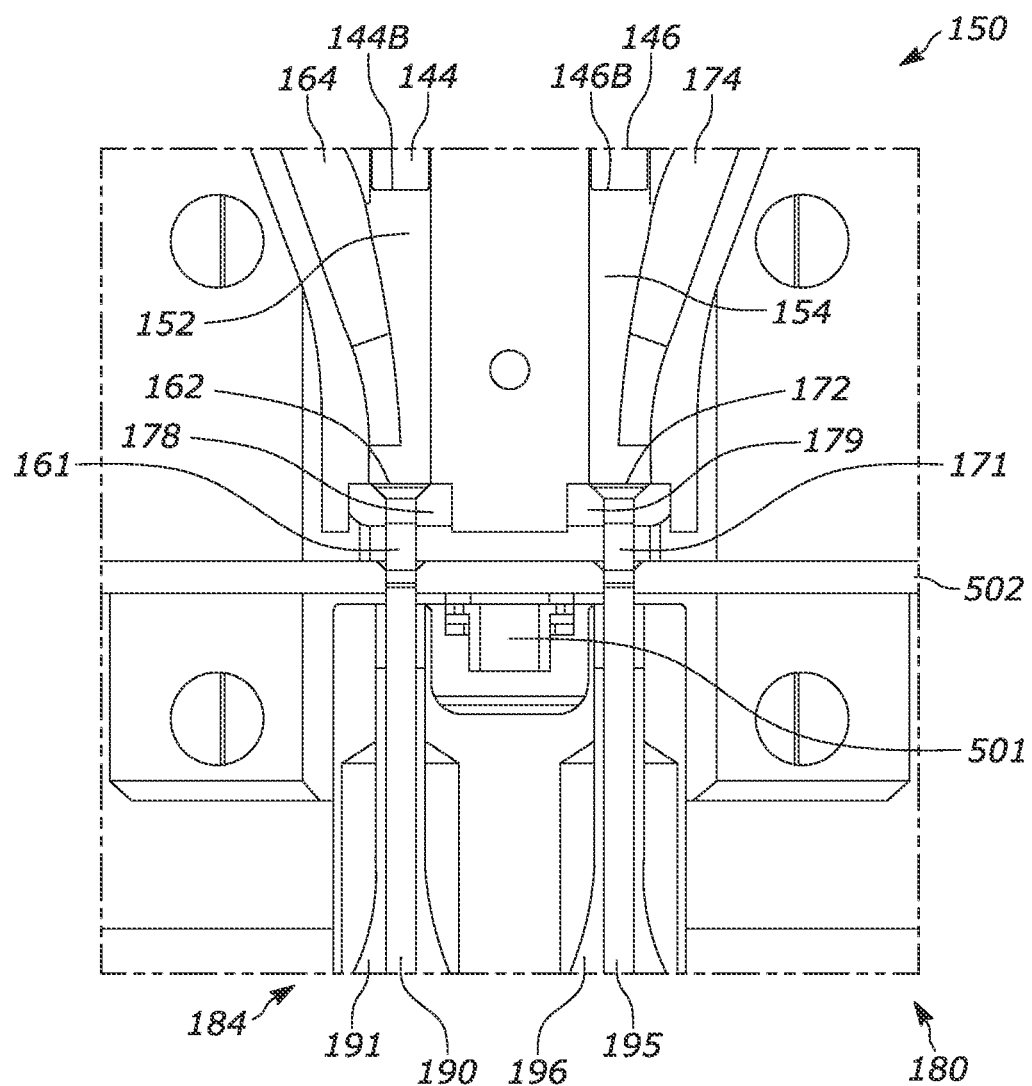
FIG. 12 illustrates the lower portion shown in FIG. 1 first contacting the workpiece, in accordance with at least one configuration.
Figure 14:
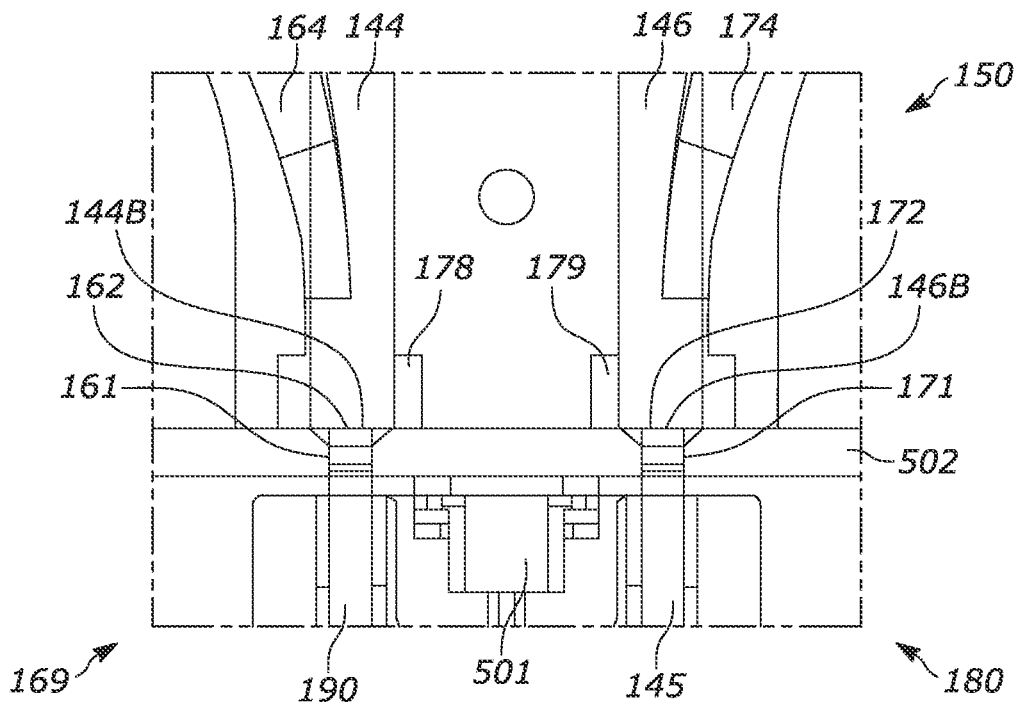
FIG. 14 illustrates rivet pins of the upper portion shown in FIG. 2, thereafter pushing the rivets fully into the workpiece, in accordance with at least one configuration.
Figure 15:
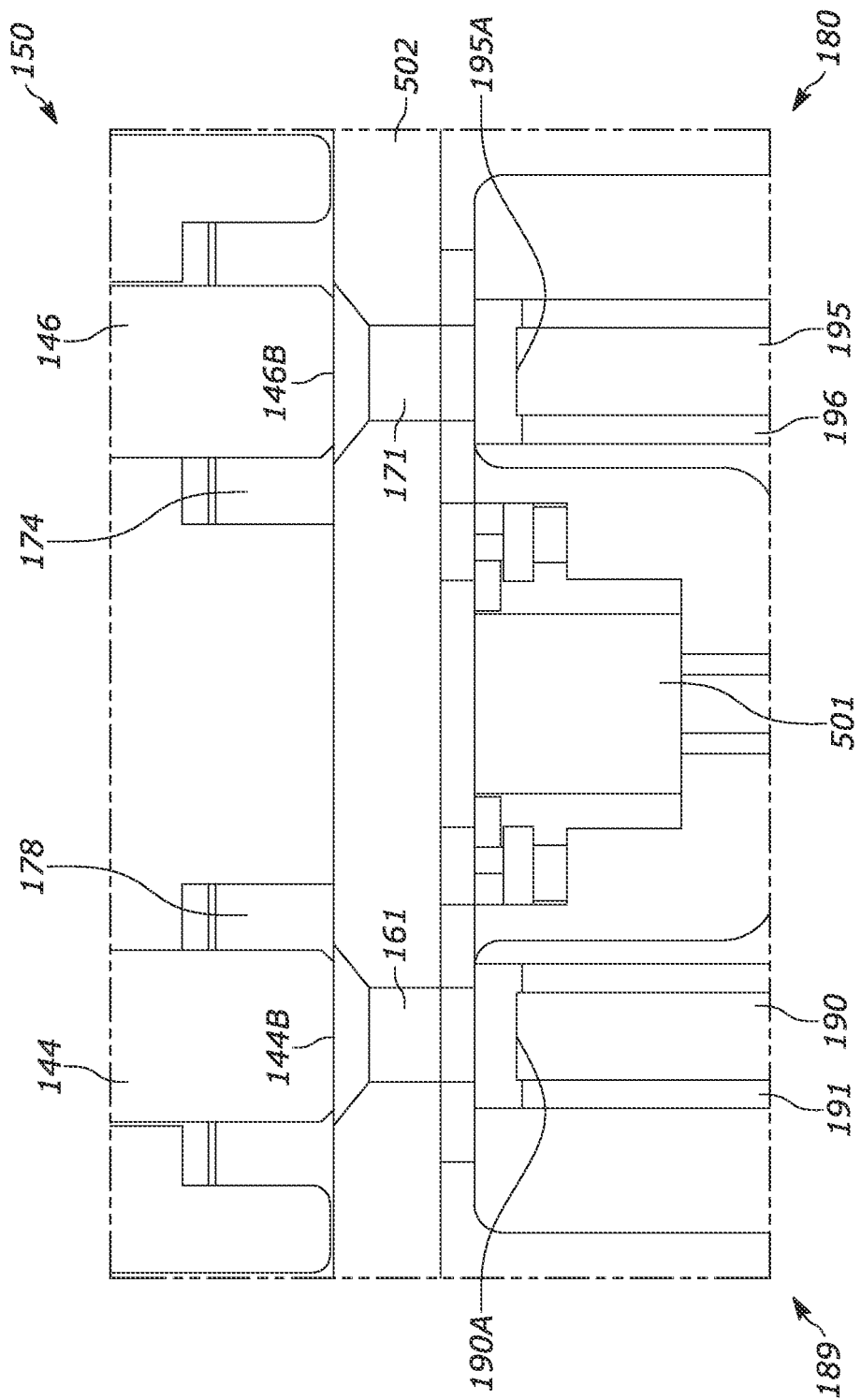
FIG. 15 illustrates center pins and forming pins of the lower portion deforming pins deforming tails of the rivets shown in FIG. 14, in accordance with at least one configuration.
Figure 16:
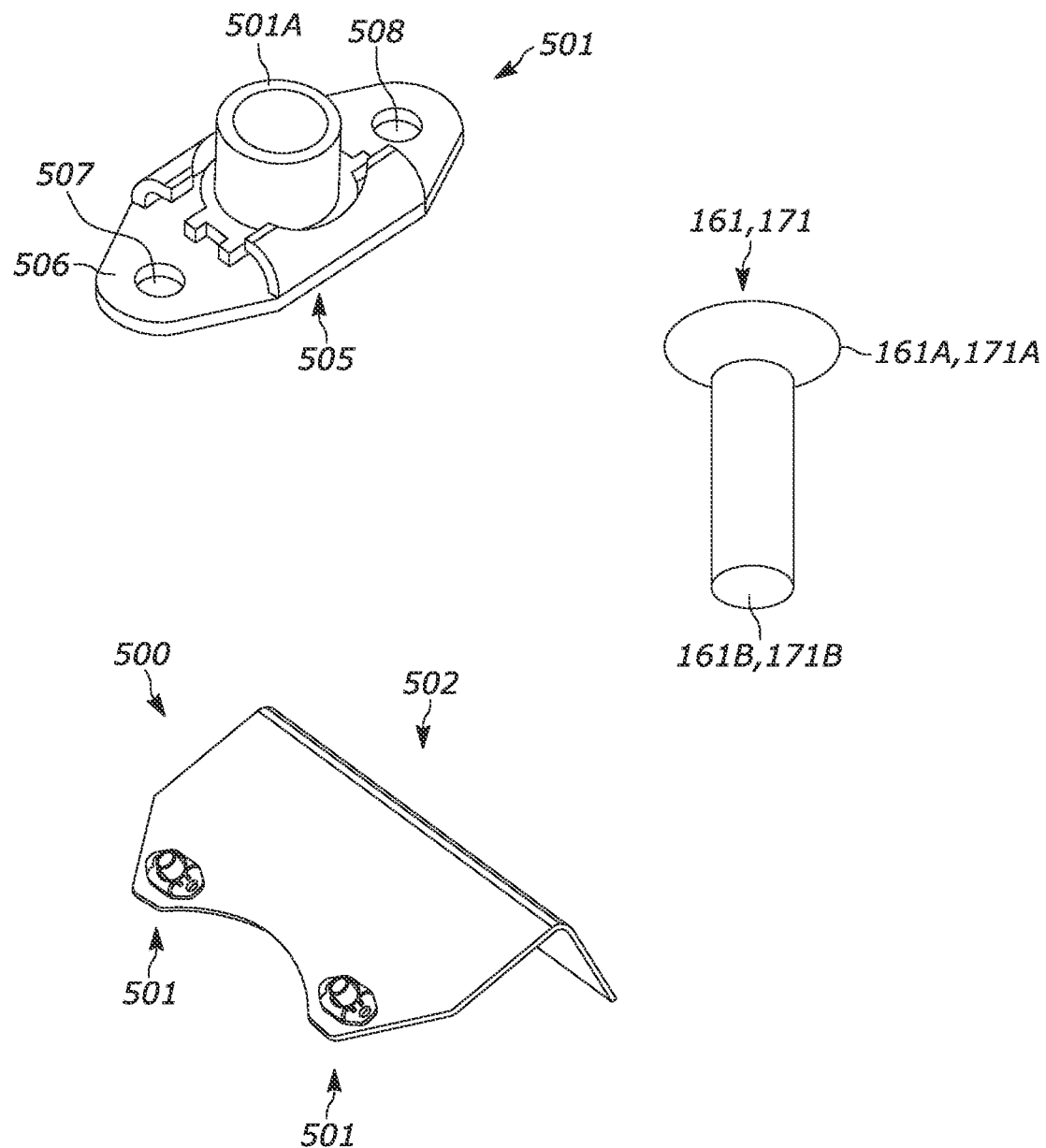
FIG. 16 illustrates an example workpiece, including an example bracket and example fastener hardware, and an example rivet, in accordance with at least one configuration.

The upper riveting portion 140 includes a coupling base 142 and a rivet block 150. The rivet block 150 includes first and second rivet pins 144, 146 (FIGS. 12, 14, and 15). One skilled in the art would appreciate that the first and second rivet pins 144, 146 are coupled substantially centrally to the coupling base 142, with the spacing of the first and second rivet pins 144, 146 depending upon the particular fastener hardware and bracket being riveted. One skilled in the art would also appreciate that the rivet apparatus 12 is an example of such an apparatus, and that the rivet apparatus 12 can include less rivet pins (e.g., one) than the example rivet apparatus 12 or more rivet pins than the rivet apparatus 12, dependent upon the particular fastener hardware and bracket being riveted.

In at least one configuration, the coupling base 142 is coupled to the rivet block 150 in a releasable manner, such via quick connect couplings 143. It is contemplated that the quick connect couplings 143 may be utilized where the coupling base 142 can be removed from the rivet block 150 without tools by an operator of the rivet apparatus 12. This simplified removal allows changeout for different versions of the quick upper riveting portion 140, such as for ones including more or less rivet pins that the example rivet apparatus 12 shown, for different size rivets, etc. In at least one other configuration, the coupling base 142 may be fixedly coupled to the rivet block 150, or may be removable with the use of tools or the like.

The first rivet pin 144 and the second rivet pin 146 are generally in a parallel spaced apart configuration (generally corresponding to the spacing between the rivets 161, 171), and are pushed at a perpendicular angle into the fastener hardware 501 and the bracket 502 from the head end 161A, 171A of the rivets 161, 171, respectively. The distal ends 144B, 146B, of the first and second pins 144, 146, respectively, push against the head ends 161A, 171A of the rivets 161, 171, respectively, to push the rivets 161, 171 into the fastener hardware 501 and the bracket 502. In at least one configuration of the rivet apparatus 12, the distal ends 144B, 146B of the first and second rivet pins 144, 146 are approximately a same width as heads 161A, 171A of the rivets 161, 171, respectively, as shown in FIGS. 14 and 15. In the example shown, the heads 161A, 171A are countersink type heads such that the heads 161A, 171A are configured to sit flush with the workpiece 500 once installed, as shown in FIGS. 14 and 15, although the rivet apparatus 12 can be used with other types of rivets having other types of heads. Although two portions of the workpiece 500 (FIGS. 5-8 and 12-16) are disclosed herein, including a bracket 502 and fastener hardware 501, one skilled in the art would appreciate that the workpiece 500 can include more portions that the example disclosed.

The rivet apparatus 12 rivets the workpiece 500 (FIGS. 5-10 and 12-15). In at least one configuration, a system 200 can include a drill apparatus 11, the rivet apparatus 12, the drill apparatus 11 being coupled to the rivet apparatus 12 via a housing 13, as shown. It will be understood that the rivet apparatus 12 is utilized to couple a fastener hardware 501 (e.g., nut plate) (FIGS. 5-10 and 12-15) to a bracket 502 (FIGS. 5-10 and 12-15), together forming the workpiece 500, via fasteners, such as rivets 161, 171, with the rivets 161, 171 securing the fastener hardware 501 to the bracket 501. Each of the rivets 161, 171 include a head end 161A, 171A and a tail end 161B, 171B, respectively. The configuration of the fastener hardware 501, the brackets 502 and the rivets discussed herein can be varied and the disclosure is not limited to any particular configuration of any of these components.

In at least one configuration of the rivet apparatus 12, the rivet block 150 is moveable toward fixed ends (not shown) of the first and second rivet pins 144, 146 such that the first and second rivet pins 144, 146 stop flush with an end of the rivet block 150, as shown in FIGS. 14 and 15. The rivet block 150 includes pathways or bores through which the rivets 161, 171 traverse and additional pathways or bores through which the first and second pins 144, 146 traverse. In at least one configuration of the rivet apparatus 12, the rivet block 150 includes a first pin bore 152 and a second pin bore 154. The rivet block 150 further includes a first rivet feed bore 164 that is coupled to and is oblique (e.g., approximately 20 degrees) to the first pin bore 152, although other angles are possible dependent upon a configuration of rivet locations on the workpiece.

Figure 5A:
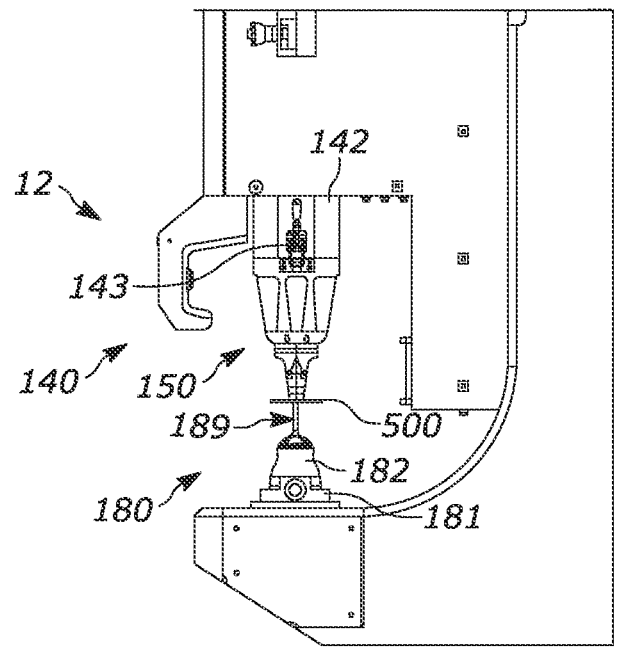
FIGS. 5A and 5B illustrate a side view of first and second positions of an upper portion of the rivet apparatus relative to the lower portion shown in FIG. 2, in accordance with at least one configuration.
Figure 5B:
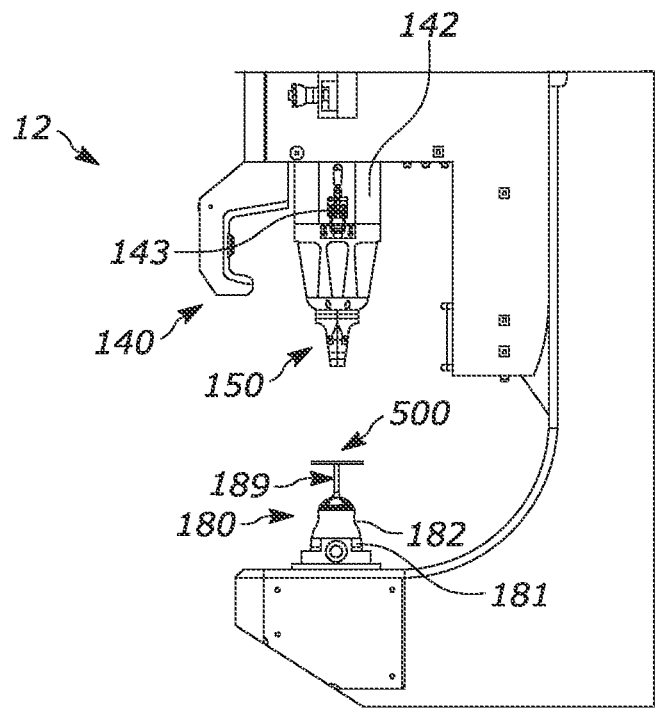
Figure 6A:
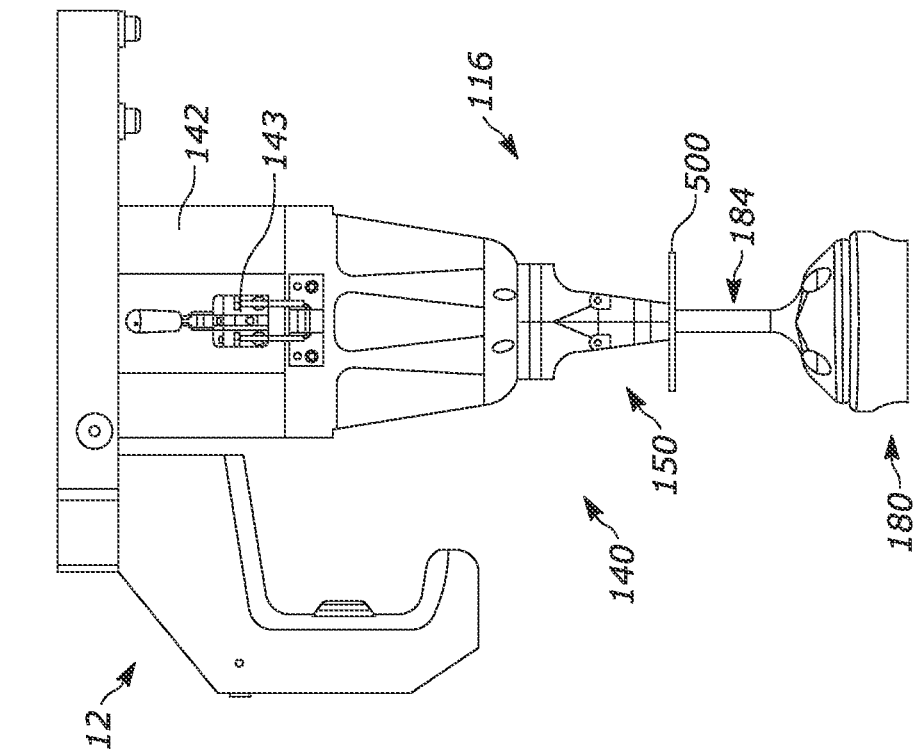
FIGS. 6A and 6B illustrate another a side view of first and second positions of the upper portion relative to the lower portion shown in FIG. 2, against a workpiece, in accordance with at least one configuration.
Figure 6B:
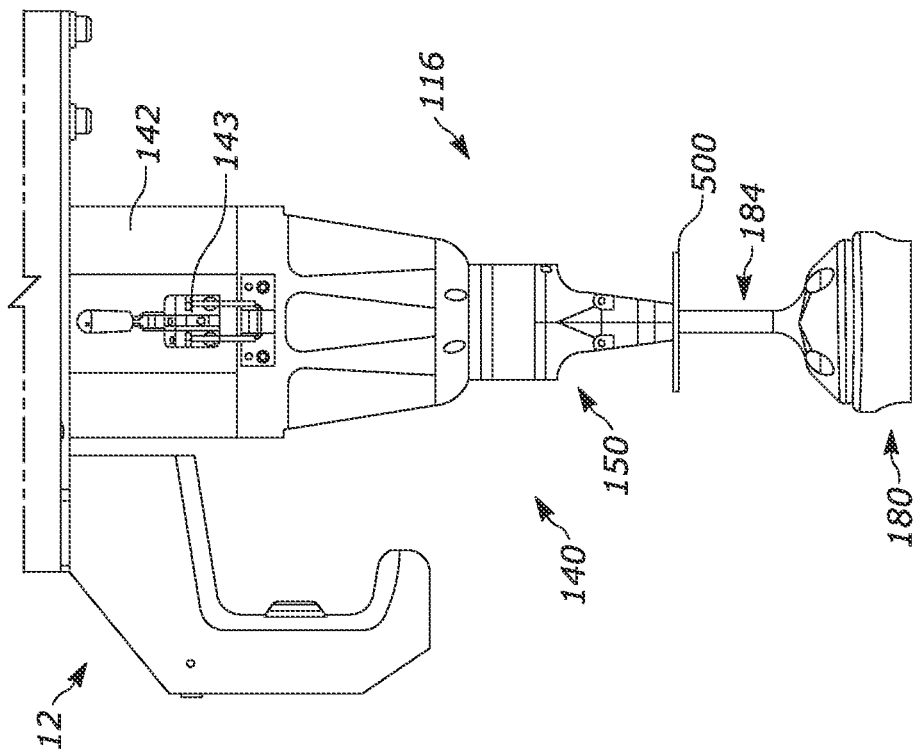

As with the first pin bore 152, a second rivet feed bore 174 is coupled to and is oblique (e.g., approximately 20 degrees) to the second pin bore 154. It will be understood that rivets 161, 171 can be directed through the rivet feed bores 164, 174, respectively, and into position proximate the bottom ends 162, 172 of the respective first and second pin bores 152, 154. The first pin bore 152 and the second pin bore 154 are spaced apart from each other such that the first rivet pin 144 extends into the first pin bore 152 and the second rivet pin 146 extends into the second pin bore 154. The rivet block 150 can include a lower position (FIGS. 5B and 6A) and an upper position (FIGS. 5A and 6B). The first and second rivet feed bores 164, 174 can slide into and out of first and second rivet feed tubes (not shown) when the rivet feed block 150 moves upward and downward, respectively.

Figure 8B:
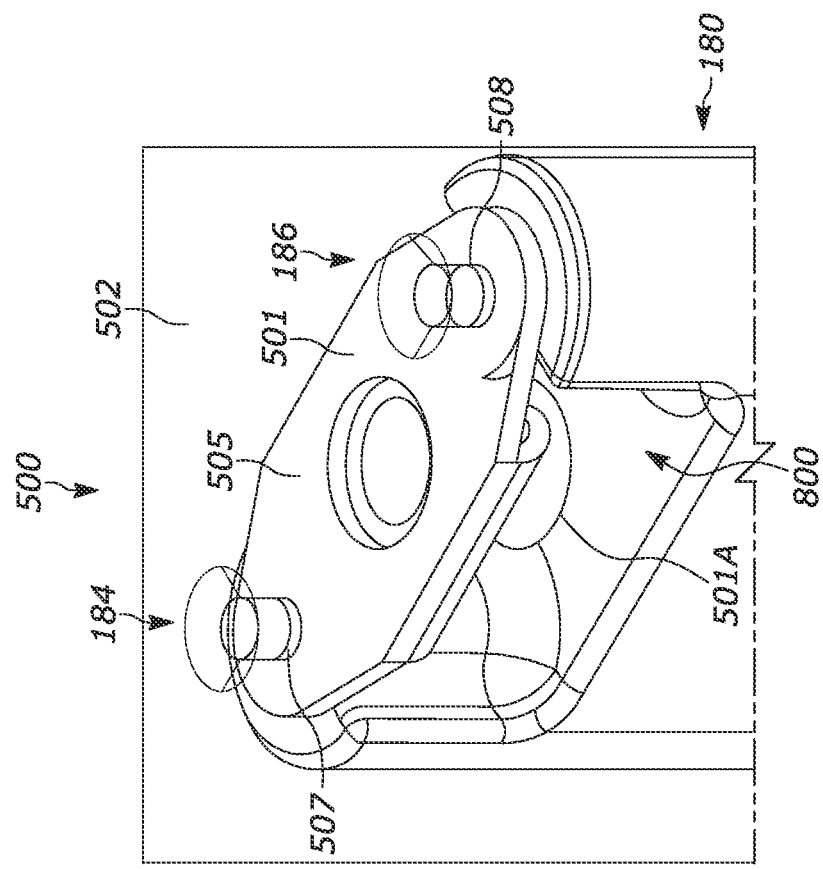
FIGS. 8A and 8B illustrate a fastener hardware disposed on the lower portion and the workpiece disposed on the lower portion, respectively, in accordance with at least one configuration.
Figure 8A:
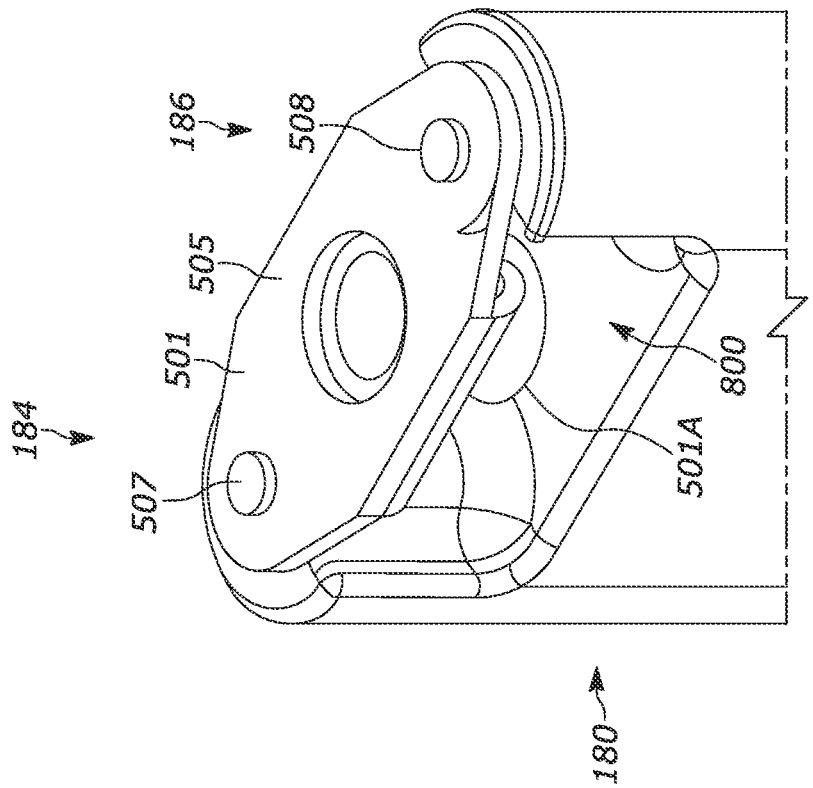
Figure 11:
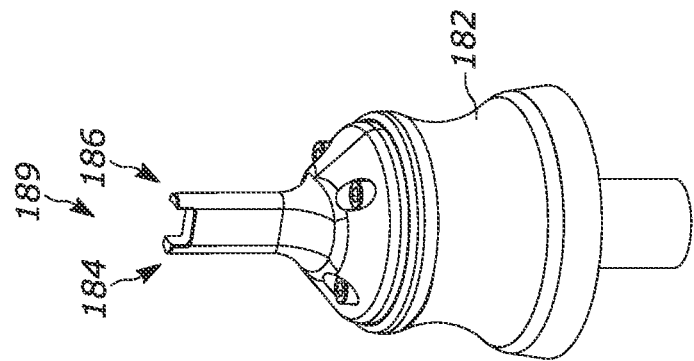
FIG. 11 illustrates an isometric detailed view of a pin assembles coupled to a support member, in accordance with at least one configuration.
Figure 10:
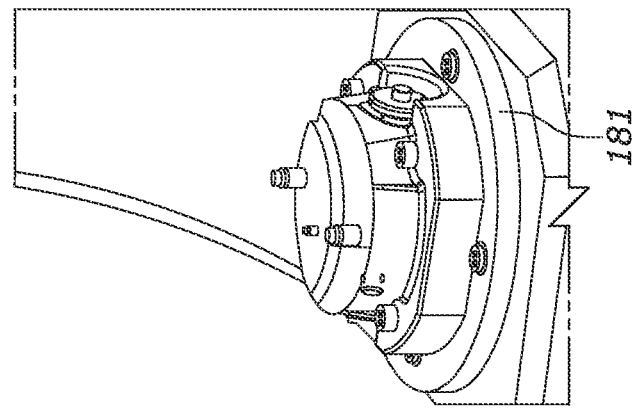
FIG. 10 illustrates an isometric detailed view of the fixed base of the lower portion, in accordance with at least one configuration.
Figure 9:
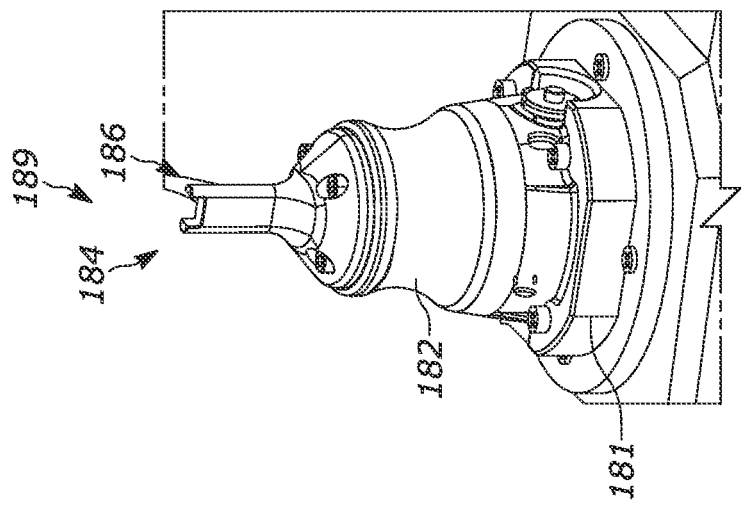
FIG. 9 illustrates an isometric detailed view of the lower portion, in accordance with at least one configuration.

In operation of the rivet apparatus 12, once rivet openings 507, 508 have been formed (e.g., such as drilled by the drill apparatus 11) for the bracket 502, the bracket 502 and the fastener hardware 501 can be joined with use of the rivets 161, 171. Specifically, the fastener hardware 501 is mounted onto the lower riveting portion 180. In particular, the fastener hardware 501 is positioned so that it is centered so that the center pins 190 and 195 can extend through the rivet openings 507, 508 of the fastener hardware 501, with a bottom surface 505 (opposite a top surface 506) of the fastener hardware 501 facing upwardly, as shown in FIGS. 8A and 8B. In at least one configuration, the lower riveting portion 180 includes a notch 800 (FIG. 8) disposed on a distal end of the lower riveting portion 180. The notch 800 is disposed between the first pin assembly 184 and the second pin assembly 186. A portion of the fastener hardware 501, such as a neck 501A of the fastener hardware 501, is disposed within the notch 800. The lower riveting portion 180 can be easily modified, with changing a distance between the first and second pin assemblies 184, 186. This easy of modification of the lower riveting portion 180 has particular application to the aerospace industry where different fasteners have small deviations with respect to a distance between their rivet openings, although such easy of modification can be applied to other industries.

Next, the bracket 502 is introduced onto the bottom surface 505 of the fastener hardware 501, such that openings rivet openings 507, 508 within the bracket 502 align with the rivet openings 507, 508, respectively, of the fastener hardware 501. The center pins 190, 195 first extended through the rivet openings 507, 508, respectively, of the fastener hardware 501 and then extend through the rivet openings 507, 508, respectively, of the bracket 502. Once properly aligned, the rivets 161, 171 can be blown or otherwise directed through the first and second rivet feed bores 164, 174 of the rivet block 150. The rivet apparatus 12 can further include blow feed compensators 310, 320 (FIG. 3) that are actuated to blow the rivets 161, 171 through the first and second rivet feed bores 164, 174 of the rivet block 150. Sensors 311, 321 can be disposed within the blow feed compensators 310, 320, respectively, to verify their actuation when an operator is about rivet a workpiece.

In at least one configuration of the rivet apparatus 12, the rivet block 150 further includes first and second rivet retainers 178, 179 disposed at the bottom ends 162, 172 of the first and second pin bores 152, 154, respectively. In at least one configuration, the first and second rivet retainers 178, 179 can include movable jaws or the like positioned with the first and second rivet feed bores 164, 174 to retain the rivets 161, 171, which movable jaws or the like being biased together to so retain the rivets 161, 171. This biasing can be overcome by the movement of the first rivet pin 144 and the second rivet pin 146 against the respective rivets 161, 171.

Figure 13:
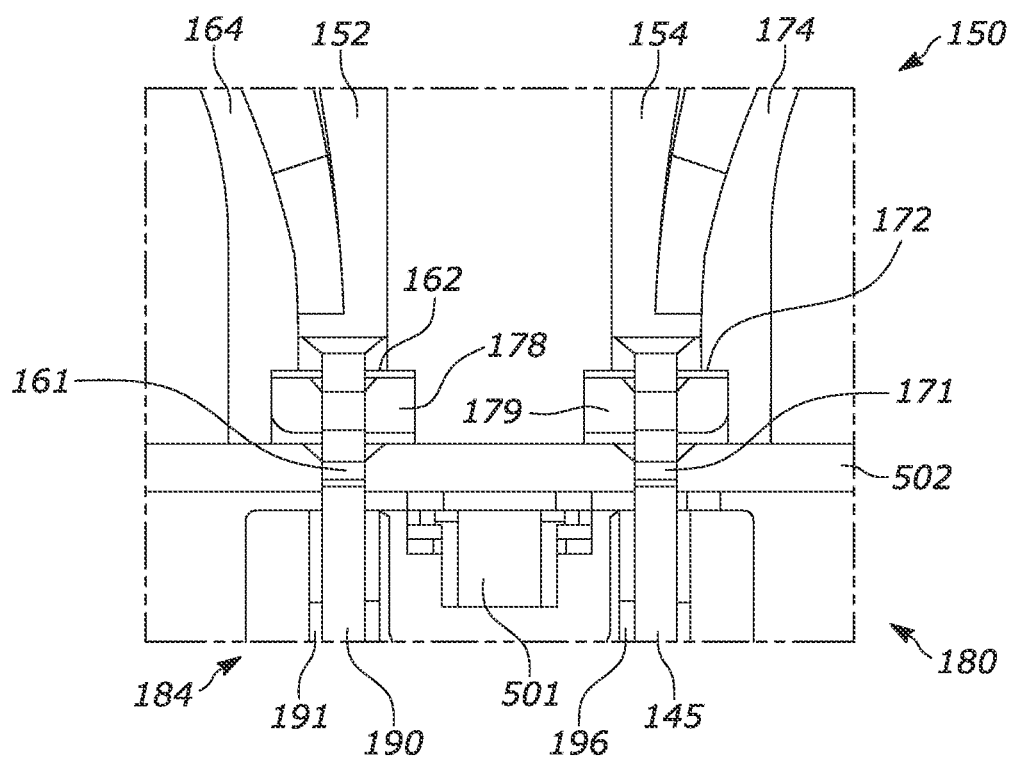
FIG. 13 illustrates center pins of the lower portion shown in FIG. 12, thereafter pushing the rivets upward, in accordance with at least one configuration.

The drill apparatus 12 is activated so as to move the upper riveting portion 140 toward the lower riveting portion 180. As the lower riveting portion 180 descends, eventually, the rivet block 150 engages with the bracket 502 (FIGS. 5-7 and 12) sandwiching the workpiece 500 between the upper riveting portion 140 and the lower riveting portion 180, with the rivets 161, 171 getting pushed into the bracket 502 (FIG. 12). Then as the upper riveting portion 140 continues to move downward, the rivets 161, 171 get pushed upward by the center pins 190, 195 (FIG. 13). Eventually, the rivets 161, 171 are pushed by the first and second pins 144, 146, respectively, fully through both the bracket 502 and the fastener hardware 501 and toward the forming pins 191, 196 (FIG. 14). The first and second pins 144, 146 continue driving the rivets 161, 171 downward and the outer shroud biasing members 193, 198 begin to compress, driving the bracket 502, the fastener hardware 501, and the rivets 161, 171 toward the forming pins 191, 196.

The rivet block 150 reaches a point where it cannot move further downward at which point the rivet block 150 moves back upward toward the coupling base 142 (FIGS. 5A and 6B). At this point the rivets 161, 171 are fully seated into the bracket 502 (FIG. 14). Eventually, the center pins 190, 195 reach the end of their travel, creating a substantially flat coplanar forming surface with the forming pins 191, 196, deforming the tail ends 161B, 171B of the rivets 161, 171 (FIG. 15), respectively, thereby sandwiching and joining together the fastener hardware 501 and the bracket 502. In at least one configuration the center pins 190, 195 extending slightly above the forming pins 191, 196 as shown. The deforming pins 190, 195 correspond to the rivet pins 144, 146, to together deform the tail ends 161B, 171B of the rivets 161, 171. Once the workpiece has been riveted, the upper riveting portion 140 can then move from its lowest position (FIG. 5A) to its home position or upmost position (FIG. 5B), at which point the rivet apparatus 12 is ready to rivet another workpiece.

Figure 7:
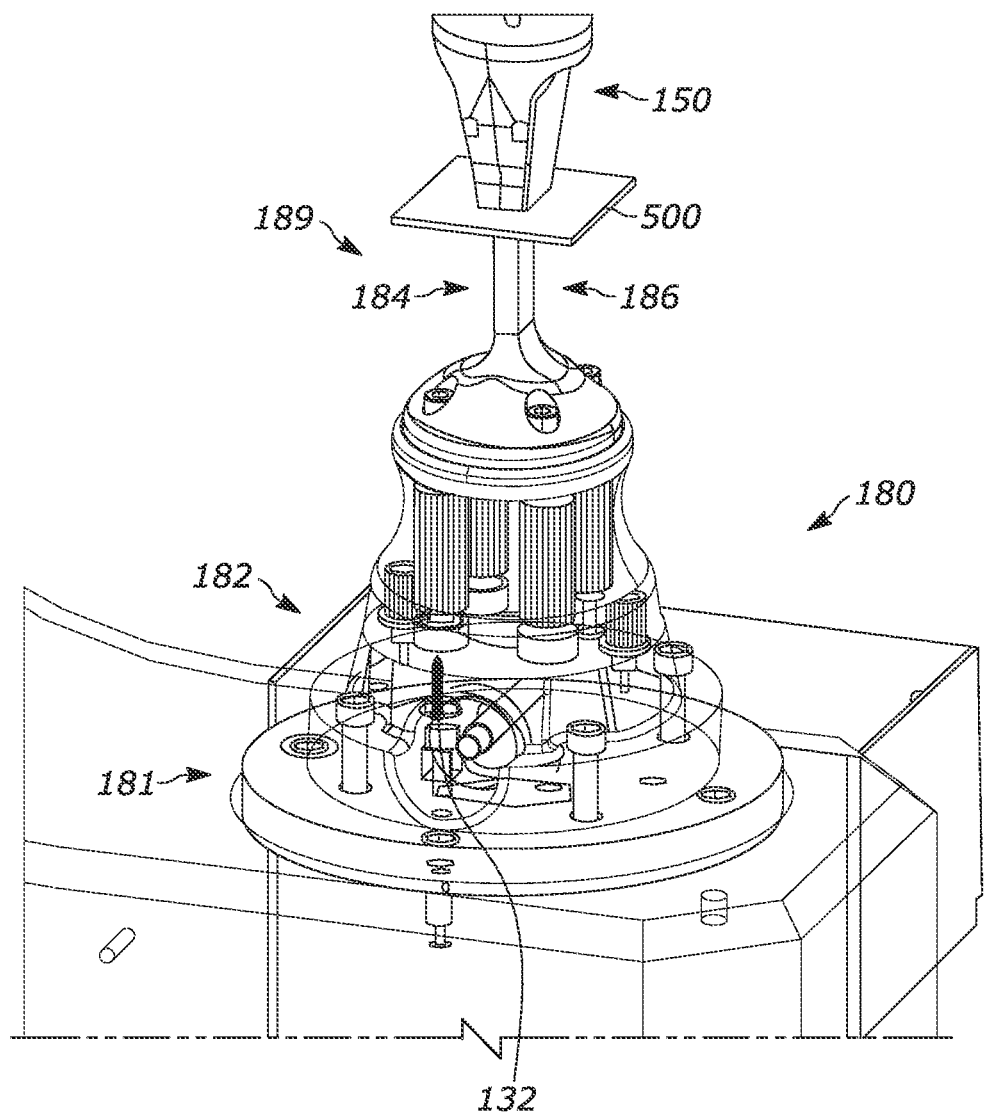
FIG. 7 illustrates an isometric cut view of a fixed base and a support member of the lower portion shown in FIG. 2, in accordance with at least one configuration.

It will be understood that an amount of force and an amount of movement of the upper riveting portion 140 can be controlled by a sensor, such as a position sensor 132 (e.g., Linear Variable Differential Transformer (LVDT)). In at least one configuration, the position sensor 132 can be disposed within the support member 182, as shown in FIG. 7. Once the rivet apparatus 12 has completed riveting the workpiece 500, such as determined via the position sensor 132, the upper riveting portion 140 can be retreated from the joined bracket 502 and fastener hardware 501, that is the workpiece 500, so that an operator of the rivet apparatus 12 can remove the workpiece 500 from the rivet apparatus 12 and rivet another workpiece.

It will be understood that different riveting assemblies can be provided for different fastener hardware and brackets. For example, the rivet openings may be positioned further or closer to each other in different configurations, the rivet openings may be larger or smaller, there may be more or less rivet openings than the examples shown herein, etc. Additionally, the rivets may be longer or shorter, wider or narrower, etc., as the thickness of the fastener hardware and the bracket may be longer or shorter. Thus, a user can easily change the lower riveting portion 180 and the upper riveting portion 140 to accommodate for different fastener hardware and the brackets, such as without the use of tools.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A rivet apparatus to rivet a workpiece comprising fastener hardware and a bracket, the rivet apparatus comprising:
   an upper riveting portion having a rivet block terminating at a bracket contact surface, and movable jaws positioned within the upper riveting portion to releasably retain a rivet, the movable jaws being movable while the bracket contact surface is in engagement with a bracket, and a rivet pin directable through the movable jaws while the bracket contact surface is in engagement with a bracket; and
   a lower riveting portion comprising a fixed base with a support member attached thereto, and a pin assembly, the pin assembly comprising;
   a center pin structurally configured to extend sequentially through rivet openings of the fastener hardware and the bracket to align the rivet openings of the fastener hardware and the bracket and to push against a tail of a rivet to deform the tail of the rivet;
   a forming pin, fixedly coupled to the support member, to push against the tail of the rivet to deform the tail of the rivet;
   a first biasing member, disposed below the center pin, to bias the center pin through the forming pin and away from the support member;
   an outer shroud encircling the forming pin and the center pin and providing a shroud base onto which the bracket is to be positioned; and
   a second biasing member, disposed below the outer shroud, to bias the outer shroud away from the support member;
   the bracket contact surface directable into an orientation relative to the lower rivet portion so that the bracket contact surface of the rivet block is structurally configured to engage the bracket while a distal end of the outer shroud is structurally configured to engage the fastener hardware, retaining the fastener hardware and bracket therebetween while the center pin extends through the openings in each of the fastener hardware and the bracket.

2. The rivet apparatus according to claim 1, wherein the pin assembly is a first pin assembly and the rivet is a first rivet, the lower riveting portion further comprising:
   a second pin assembly comprising;
   a second center pin to push against a tail of a second rivet to deform the tail of the second rivet;
   a second forming pin, fixedly coupled to the support member, to push against the tail of the second rivet to deform the tail of the second rivet;
   a third biasing member, disposed below the second center pin, to bias the second center pin through the second forming pin and away from the support member;
   a second outer shroud encircling the second forming pin and the second center pin; and
   a fourth biasing member, disposed below the second outer shroud, to bias the second outer shroud away from the support member.

3. The rivet apparatus according to claim 2, wherein the lower riveting portion further includes a notch disposed on the distal end of the outer shroud of the lower riveting portion, the notch disposed between the first pin assembly and the second pin assembly, with a portion of a fastener hardware being riveted to a bracket by the rivet apparatus being disposed within the notch.

4. The rivet apparatus according to claim 1, wherein the first and second biasing member are at least one of a spring, a pneumatic cylinder, and a gas shock.

5. The rivet apparatus according to claim 1, further comprising a position sensor, disposed within the support member, to provide dynamic information relative to a stack-up thickness of the workpiece.

6. A system including the rivet apparatus according to claim 1, the system further comprising a drill apparatus coupled to the rivet apparatus via a housing, the drill apparatus to drill a bracket of the workpiece.

7. The rivet apparatus according to claim 1, wherein the rivet includes a countersink type head.

8. The rivet apparatus according to claim 1, wherein the center pin is approximately a same width as the tail of the rivet.

9. The rivet apparatus according to claim 1, wherein the center pin has a length such that a distal end of the center pin extends above a stack-up thickness of the workpiece disposed on the lower riveting portion.

10. The rivet apparatus according to claim 1, wherein the rivet pin pushes on a head of the rivet while the center pin and the forming pin push on the tail of the rivet.

11. The rivet apparatus according to claim 1, wherein the first biasing member is structurally configured to direct the center pin into contact with a rivet, and, to slidably move a rivet retained by the movable jaws.

12. The rivet apparatus according to claim 1 wherein the movable jaws are recessed relative to the bracket contact surface, so as to remain spaced apart from the bracket when the bracket contact surface is in contact with the bracket.

* * * * *